United States Patent

Kobayashi et al.

[11] Patent Number: 5,951,721
[45] Date of Patent: Sep. 14, 1999

[54] PROCESS FOR PRODUCING SOLID ELECTROLYTIC CAPACITOR

[75] Inventors: Atsushi Kobayashi; Hiroshi Yageta; Tomohide Date; Takashi Fukaumi, all of Tokyo, Japan

[73] Assignee: NEC Corporation, Japan

[21] Appl. No.: 08/839,259

[22] Filed: Apr. 17, 1997

[30] Foreign Application Priority Data

Apr. 19, 1996 [JP] Japan .................................. 8-122250

[51] Int. Cl.$^6$ ....................................................... H01G 9/00
[52] U.S. Cl. ........................................................ 29/25.03
[58] Field of Search ............................................ 29/25.03

[56] References Cited

U.S. PATENT DOCUMENTS

| | | |
|---|---|---|
| 3,950,842 | 4/1976 | Fournier et al. . |
| 4,046,645 | 9/1977 | Yoshida et al. . |
| 4,622,109 | 11/1986 | Puppolo . |
| 5,567,209 | 10/1996 | Kobayashi et al. . |
| 5,855,755 | 1/1999 | Murphy et al. . |

FOREIGN PATENT DOCUMENTS

| | | |
|---|---|---|
| 64-24410 | 1/1989 | Japan . |
| 6-271655 | 9/1994 | Japan . |

*Primary Examiner*—John F. Niebling
*Assistant Examiner*—Josetta Jones
*Attorney, Agent, or Firm*—Ostrolenk, Faber, Gerb & Soffen, LLP

[57] ABSTRACT

A thick layer of polyaniline is evenly and efficiently deposited on the surface as well as the edges of an anode porous metal. A porous film-forming metal or porous valve metal is immersed in an anilinum protonic salt solution of a high temperature and a high concentration, thereafter, anilinum protonic salt crystals are deposited on the surface of the porous metal by cooling the porous metal to or below the dissolution temperature of the solution, and the porous metal is immersed in an oxidant solution.

4 Claims, 3 Drawing Sheets

PROCESS FOR PRODUCING SOLID ELECTROLYTIC CAPACITOR

BACKGROUND OF THE INVENTION

1. Field of the Invention

The present invention relates to a process for producing a solid electrolytic capacitor, and more specifically to a process for producing a solid electrolytic capacitor using polyaniline as the solid electrolyte.

2. Description of the Prior Art

A solid electrolytic capacitor using a high-polymer, such as polyaniline, as the solid electrolyte has a lower impedance in a high-frequency region compared with a solid electrolytic capacitor using an inorganic electrolyte, such as manganese dioxide, as the solid electrolyte. And now, a solid electrolytic capacitor using polypyrrole as the solid electrolyte is commercially manufactured.

There have been proposed as conventional processes for producing solid electrolytic capacitors using conducting polymers such as polyaniline as solid electrolytes, a method in which polyaniline or polypyrrole is deposited onto a surface-oxidized film by a monomer such as aniline or pyrrole on the surface-oxidized film, and a method in which a fused conducting polymer such as polyaniline or polypyrrole or the solution thereof is deposited onto a surface-oxidized film of a film-forming metal or valve metal such as tantalum and aluminium.

For example, Japanese Unexamined Patent Publication (Kokai) No. 64-24410 discloses a method in which a conducting polymer layer is formed by sequentially introducing a monomer and an oxidant onto a surface-oxidized film and allowing them to react on the surface of the oxidized film. In this publication, a method for producing a solid electrolytic capacitor by forming a solid electrolyte layer consisting of a dielectric polymer compound on a dielectric oxidized film, in which the monomer of a dielectric polymer compound in a liquid state is introduced onto a dielectric oxidized film (Step 201 in FIG. 3), and then an oxidant solution containing an organic acid or the salt thereof is introduced (Step 202 in FIG. 3).

In Japanese Unexamined Patent Publication (Kokai) No. 6-271655, there is disclosed a method for forming a conducting polymer film on the entire surface of a porous electrode by impregnating a solution that contains a monomer forming a conducting polymer and a carrier electrolyte into a porous electrode having minute pores, such as a sintered tantalum electrode, and electrolytically oxidizing it in the carrier electrolyte.

There are some problems when polyaniline is to be formed on the surface-oxidized film of a film-forming porous metal using conventional methods described above.

The first problem is that since a thick polyaniline layer is difficult to form on the surface of the porous metal, the process for forming polyaniline layers must be repeated resulting in poor productivity.

In the process for producing a solid electrolytic capacitor, a solid electrolyte is deposited on the surface-oxidized film of a film-forming porous metal, and then an electrode is tapped using carbon paste or silver paste and the porous metal is encapsulated using a resin material. In order not to damage the oxidized film during these processes, a solid electrolyte layer of a thickness more than a certain value (5 $\mu$m or more) must have been formed on the outer surface of the porous metal.

In conventional processes, however, since the thickness of a polyaniline layer formed in a cycle of a series of steps is small, and a number of steps must be repeated in order to achieve a desired thickness.

For example, in the description of an embodiment of the above Japanese Unexamined Patent Publication (Kokai) No. 64-24410, although a method for depositing polyaniline on a porous metal by introducing into an aniline monomer the porous metal, and thereafter introducing a mixed solution of an oxidant and a protonic acid (see FIG. 3), when this method is actually carried out, the thickness of a polyaniline layer formed in a cycle of a series of steps was 1 $\mu$m or less.

Thus, in conventional methods, the thickness of a polyaniline layer formed in a cycle of a series of steps was thin and limited. In order to form a multilayer structure to achieve a sufficient film thickness, therefore, a number of cycles had to be repeated resulting in poor productivity.

The second problem is that polyaniline is difficult to form on the edges of a porous metal (for example, edges and vertices if the porous metal is a rectangular parallelepiped), and defective capacitors due to the damage of oxidized films on the edges of the porous metal are frequently produced.

In order not to damage the oxidized film during steps such as encapsulation by exterior resin after the formation of the solid electrolyte described above, the solid electrolyte must also be deposited on the edges of the porous metal.

In conventional methods, however, polyaniline was difficult to form on the edges of the porous metal.

That is, in conventional methods, although desired thickness of polyaniline layers on the flat surface of the porous metal could be achieved by repeating steps for depositing polyaniline layers, little polyaniline was deposited on the edges of the porous metal. For example, in the description of an embodiment of the above Japanese Unexamined Patent Publication (Kokai) No. 64-24410, the thickness of polyaniline deposited on the edges of the porous metal was 0.5 $\mu$m or less even if a series of cycles were repeated five times.

Therefore, it is an object of the present invention to provide an efficient process for producing a polyaniline solid electrolytic capacitor.

It is another object of the present invention to provide an process for producing a polyaniline solid electrolytic capacitor of a low defective electrical properties of produced capacitors.

SUMMARY OF THE INVENTION

The above and other objects are achieved by a process according to the present invention for producing a solid electrolytic capacitor using an anodic oxide film of a film forming porous metal as the dielectric, and polyaniline as the solid electrolyte comprising steps of, (a) immersing said porous metal in an anilinum protonic salt solution maintained at or above the dissolution temperature thereof, (b) thereafter cooling said porous metal to or below said dissolution temperature to deposit the crystals of anilinum protonic salt onto the surface of said porous metal, and (c) immersing said porous metal in a solution containing an oxidant.

The principle of the present invention will be described below. The inventors of the present invention found newly and independently that a large number of anilinum protonic salt crystals were evently deposited on the surface of a porous metal including edges thereof by immersing a porous metal in a hot, concentrated anilinum protonic salt solution and drying at a normal temperature, and that a thick polyaniline coating is formed on the entire surface of the porous metal including edges were formed by immersing the above porous metal in a solution containing an oxidant, and based on such findings, the inventors completed the present invention.

The inventors of the present invention also found that a thicker polyaniline coating is formed on the entire surface of the porous metal including edges were formed by immersing the above porous metal in an aqueous solution of anilinum sulfonic salt of a concentration of 40% by weight or more, drying at a normal temperature and then immersing in a solution containing an oxidant compared with a polyaniline coating obtained using an aqueous solution of anilinum sulfonic salt of a lower concentration, and based on such findings, the inventors completed the present invention.

BRIEF DESCRIPTION OF THE DRAWINGS

This above-mentioned and other objects, features and advantages of this invention will become more apparent by reference to the following detailed description of the invention taken in conjunction with the accompanying drawings, wherein.

DESCRIPTION OF THE PREFERRED EMBODIMENTS

A process for producing a solid electrolytic capacitor according to an embodiment of the present invention is the process for producing a solid electrolytic capacitor using an anodic oxide film of a film-forming porous metal as a dielectric, and polyaniline as a solid electrolyte. The process comprises the steps of immersing the porous metal in an anilinum protonic salt solution maintained at a temperature at or above the dissolution temperature (Step 101 in FIG. 1), thereafter cooling the porous metal to or below the above dissolution temperature (Step 102 in FIG. 1), and then immersing the porous metal in a solution containing an oxidant (Step 103 in FIG. 1).

Figure 1:
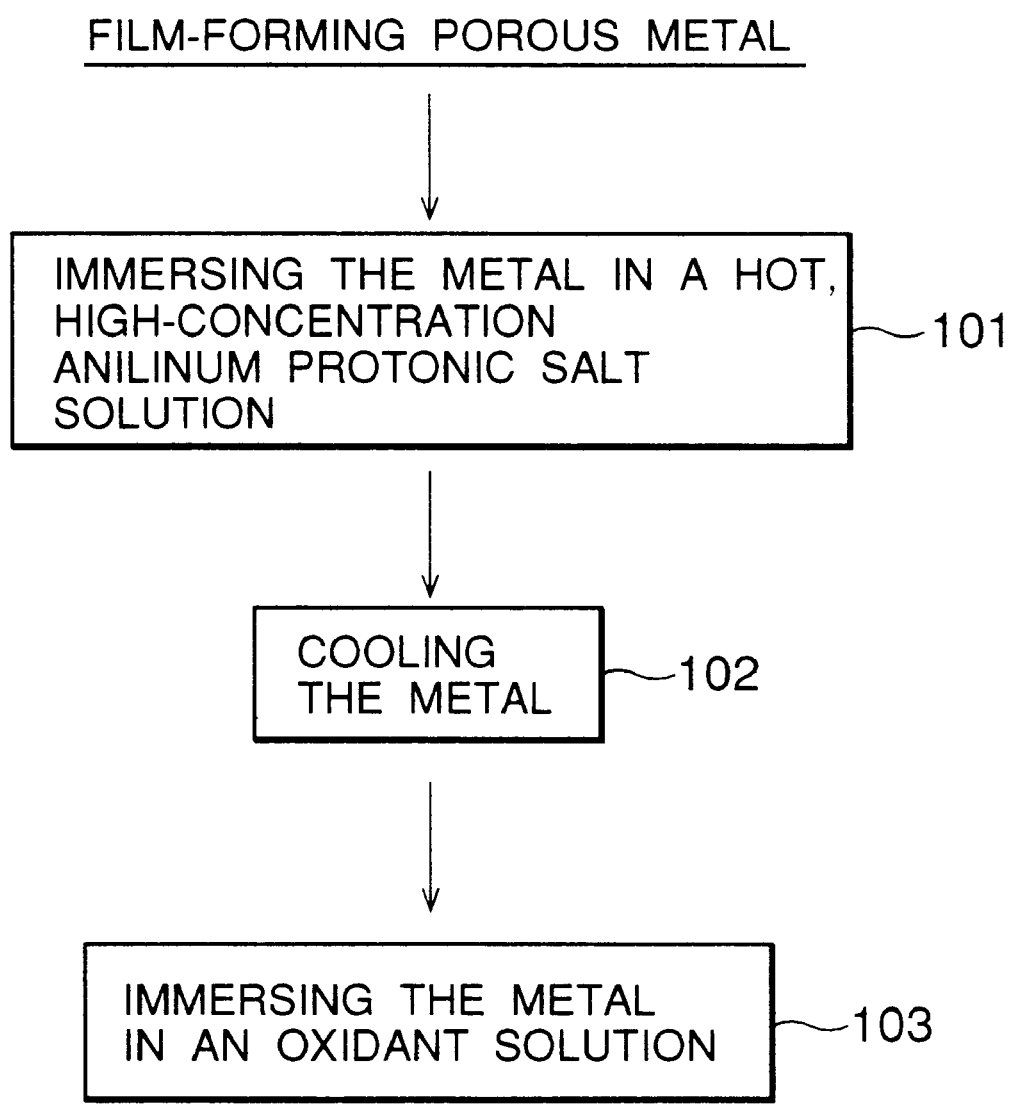
FIG. 1 shows a flowchart illustrating the process according to an embodiment of the present invention.

Another embodiment of the present invention comprises the steps of immersing a film-forming porous metal in an aqueous solution of anilinum protonic salt of a concentration of 40% by weight or more preferably maintained at a temperature at or above 70° C., thereafter cooling said porous metal preferably to or below 70° C., and immersing said porous metal in a solution containing an oxidant. FIG. 1 shows the above steps in a flowchart.

For the purpose of the present invention, the dissolution temperature means the temperature at which the solute starts precipitating in the solution when the temperature of the solution in which the solute is completely dissolved is lowered; or the temperature at which the solute is completely dissolved when the temperature of the solution in which the solute that has not been dissolved completely is precipitated to some extent is heightened.

In the present invention, the temperature of the anilinum protonic salt solution is not limited if the temperature is at or above the dissolution temperature of this solution; however, it is preferred that the temperature of the anilinum protonic salt solution is as low as possible within the range in which the solute is not precipitated, because if this temperature is too high, water evaporates easily and the solution becomes difficult to handle. Therefore, the temperature of the anilinum-protonic salt solution when the film-forming porous metal is immersed is preferably within the range between 70° C. and 95° C.

In the present invention, although the concentration of the anilinum protonic salt solution is not limited, it is preferably as high as possible. More preferably, the sum of the weights of aniline and the protonic acid is 40% or more of the total weight of the solution.

Since the anilinum protonic salt solution of such a concentration is normally difficult to obtain as a uniform solution without precipitates at a normal temperature, the solution must necessarily be warmed. Preferably, the concentration of the solution is adjusted to make the dissolution temperature within the range between 70° C. and 95° C.

In the present invention, although the mole concentration ratio of aniline and protonic acid in the anilinum protonic salt solution is not limited, it is preferred that the ratio of the mole concentration of aniline to the mole concentration of protonic acid is equal to or less than the valence number of the protonic acid. If the concentration of aniline is excessive, a uniform solution is difficult to obtain because aniline itself is insoluble in water. However, if the concentration of aniline is too low, effective aniline formation, an object the present invention, is difficult to achieve.

In the present invention, although the temperature of the anilinum protonic salt solution that is cooled after the porous metal has been immersed is not limited if it is equal to or less than the dissolution temperature of the anilinum protonic salt solution, it is preferably higher than 0° C., so that water does not freeze.

Although the protonic acid used in the present invention is not limited, sulfonic compounds are preferred in order to obtain a solid electrolytic capacitor with good properties. Examples of such compounds include alkyl sulfonic acids, alkyl benzenesulfonic acids, alkyl naphthalenesulfonic acids, benzoquinone sulfonic acid, naphthoquinone sulfonic acid, anthraquinone sulfonic acid, alkyl disulfonic acids, benzene disulfonic acid, naphthalene disulfonic acid, anthraquinone disulfonic acid, phenol sulfonic acid, sulfobenzoic acid, sulfophthalic acid, phenylmethane sulfonic acid, xylene disulfonic acid, and the derivatives of these sulfonic acids. More than one protonic acids may also be used.

As the solution containing an oxidant used in the present invention, the types of oxidants and solvents are not limited. Oxidants that may be used include for example persulfates, dichromates, hydrogen peroxide, and iron (III) salts. Solvents that may be used include for example water and the mixture of water and alcohols. The solution may contain components other than oxidants. Preferably, the solution contains an appropriate amount of a protonic acid that acts as the dopant of polyaniline.

In the present invention, the time of polymerization reaction may be while the porous metal is immersed in the oxidant solution, or may be after the porous metal has been removed from the oxidant solution. In the former case, it is preferred to keep the porous metal immersed in the oxidant solution for a rather long period of time in order to allow the monomer on the surface of the porous metal to react sufficiently. In the latter case, on the other hand, polymerization reaction may be allowed to proceed by keeping the porous metal removed from the oxidant solution for a certain period of time in the air. After polymerization reaction, it is preferred to remove excessive reaction products by washing with water.

Furthermore, the present invention may be carried out after polyaniline has been deposited on the surface of a porous metal by a method other than the methods described above. For example, after polyaniline has been impregnated in the interior of the porous metal by the other method, polyaniline may be deposited on the outer surface of the porous metal by the process of the present invention.

The present invention may be used for a solid electrolytic capacitor using polyaniline combined with other materials. For example, after polypyrrole has been impregnated in the interior of the porous metal, polyaniline may be deposited on the surface of the porous metal by the process of the present invention.

According to the process of the present invention, the following effects are observed in the process for producing solid electrolytic capacitors.

By immersing a porous metal in an aqueous solution of anilinum protonic salt and cooling the porous metal, a large quantity of anilinum protonic salt crystals can be deposited evenly on the surface as well as the edges of the porous metal. By further immersing this porous metal in an oxidant solution, a thick polyaniline layer can be formed, and the polyaniline layer can also be formed on the edges of the porous metal.

The following examples further illustrate the embodiments of the present invention in detail.

EXAMPLE 1

Figure 2:
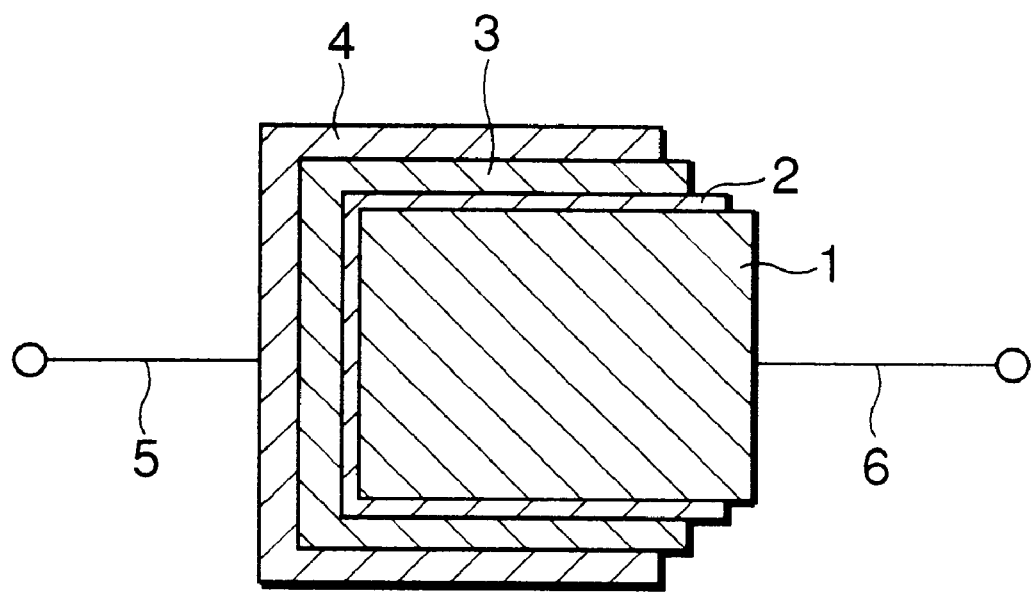
FIG. 2 shows a schematic diagram illustrating the structure of a solid electrolytic capacitor according to an embodiment of the present invention.
Figure 3:
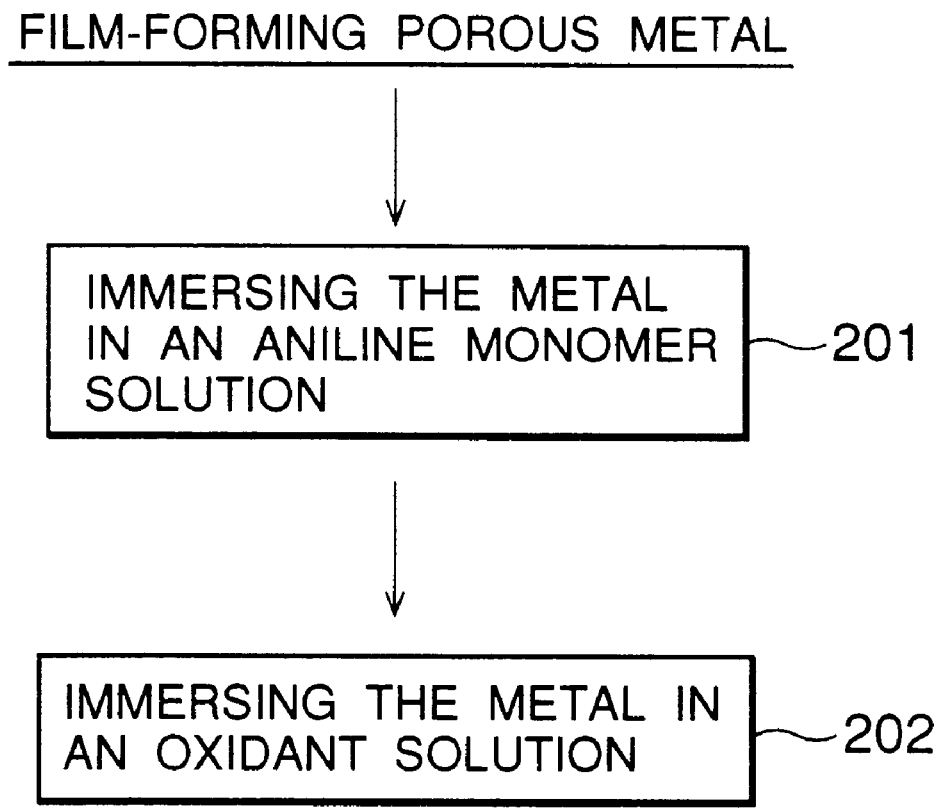
FIG. 3 shows a flowchart illustrating an example of the prior art process for producing a solid electrolytic capacitor.

FIG. 2 shows a schematic diagram illustrating the structure of a solid electrolytic capacitor according to an embodiment of the present invention.

A pellet of sintered fine tantalum powder of 1 mm cube made of fine tantalum powder having a powder CV value per 1 g 30000 (the product of capacity $\mu$F and formation voltage) was anodic-oxidized in a 0.05 wt. % phosphoric acid aqueous solution at 48.5 volts, and washed and dried.

Separately, aniline and p-toluenesulfonic acid in a mole ratio of 1:1 were dissolved in water of a temperature of 75° C. to make the sum of weight of aniline and p-toluenesulfonic acid 55% of the weight of the entire solution (Weight ratio of aniline: p-toluenesulfonic acid: water=93:190:346).

Next, the above sintered pellet (see Film-forming porous metal 1 in FIG. 2) was immersed in the above aniline solution maintained at a temperature of 75° C. to impregnate the sintered pellet into the aniline solution at an ambient temperature of 75° C., and naturally dried in an atmosphere of 25° C.

Thereafter, processes, in which the sintered pellet was immersed in a 10 wt. % aqueous solution of ammonium persulfate for 5 seconds, and was allowed to stand for 30 minutes in an atmosphere of 25° C., were repeated three times to initiate polymerization reaction.

Next, the sintered pellet was immersed in an aqueous solution of p-toluenesulfonic acid of a concentration of 95 g/l for 10 minutes to wash unnecewsary by-products, and dried at 85° C. for 10 minutes.

By repeating the processes from the impregnation of the aniline solution through washing with water twice, a polyaniline layer was formed on the surface of the sintered pellet (see 2 in FIG. 2).

By the observation of the cross-section of the sintered pellet using a scanning electron microscope, the formation of a polyaniline layer of a thickness of 30 $\mu$m on the flat area of the outer surface of the sintered pellet, and a thickness of 10 $\mu$m on the edges was confirmed.

A carbon paste was applied to this sintered pellet and dried to form a graphite layer (see 3 in FIG. 2).

Thereafter, a silver paste was applied and dried, and an electrode lead was tapped (see 4 and 5 in FIG. 2), and an electrode lead was also tapped from the sintered pellet (see 6 in FIG. 2).

Finally, the sintered pellet was encapsulated using an epoxy resin to complete the capacitor. The electrostatic capacity of this capacitor at 120 Hz was 2.9 $\mu$F, and the equivalent series resistance at 100 kHz was 200 m$\Omega$.

EXAMPLE 2

The second example of the present invention will be described below.

As an aniline solution, a solution prepared by dissolving aniline and m-xylenedisulfonic acid in the mole ratio of 2:1 in water at a temperature of 75° C., so that the sum of the weight of aniline and m-xylenedisulfonic acid becomes 42% of the weight of the entire solution (weight ratio of aniline:m-xylenedisulfonic acid:water =93:133:312) was used. Pure water was used for washing after polymerization reaction. Except for the above, the same manner as in Example 1 was repeated to form a polyaniline layer on the sintered pellet.

By the observation of the cross-section of the sintered pellet, the formation of a polyaniline layer of a thickness of 20 $\mu$m on the flat area of the outer surface of the sintered pellet, and a thickness of 7 $\mu$m on the edges was confirmed.

Also in the same manner as in Example 1, a capacitor was produced and its properties were evaluated. The electrostatic capacity of this capacitor at 120 Hz was 2.7 $\mu$F, and the equivalent series resistance at 100 kHz was 250 m$\Omega$.

EXAMPLE 3

As an aniline solution, a solution prepared by dissolving aniline and m-benzoquinonesulfonic acid in the mole ratio of 2:1 in water at a temperature of 75° C., so that the sum of the weight of aniline and m-benzoquinonesulfonic acid becomes 53% of the weight of the entire solution (weight ratio of aniline:m-benzoquinonesulfonic acid: water= 93:119:186) was used. Pure water was used for washing after polymerization reaction. Except for the above, the same manner as in Example 1 was repeated to form a polyaniline layer on the sintered pellet.

By the observation of the cross-section of the sintered pellet, the formation of a polyaniline layer of a thickness of 15 $\mu$m on the flat area of the outer surface of the sintered pellet, and a thickness of 7 $\mu$m on the edges was confirmed.

Also in the same manner as in Example 1, a capacitor was produced and its properties were evaluated. The electrostatic capacity of this capacitor at 120 Hz was 2.9 $\mu$F, and the equivalent series resistance at 100 kHz was 190 m$\Omega$.

COMPARATIVE EXAMPLE

The pellet of sintered fine tantalum powder as used in Example 1 was anodic-oxidized in the same manner as in Example 1. This pellet was immersed in a 100% stock solution of aniline at room temperature for 10 minutes, then immersed in an aqueous solution containing 20% by weight ammonium persulfate and 10% by weight p-toluenesulfonic acid at room temperature for 30 minutes to form a polyaniline layer. Thereafter, the sintered pellet was immersed in an aqueous solution of p-toluenesulfonic acid of a concentration of 95 g/l at room temperature for 10 minutes, unnecessary by-products were washed away, then the sintered pellet was dried at 85° C. for 10 minutes. At this time, the thickness of a polyaniline layer was 1 μm on the flat area of the outer surface of the sintered pellet, and only little polyaniline was deposited on the edges.

When the processes from immersion in aniline through washing and drying were repeated five times, the thickness of the polyaniline layer on the flat area of the outer surface of the sintered pellet was 4 μm, and the thickness of the polyaniline layer on the edges was 0.5 μm.

After the processes from immersion in aniline through washing and drying were repeated five times as described above, a capacitor was produced in the same manner as in Example 1 and its properties were evaluated. The electrostatic capacity of this capacitor at 120 Hz was 2.1 μF, and the equivalent series resistance at 100 kHz was 550 mΩ.

As described above, according to the process of the present invention for producing a solid electrolytic capacitor, the following advantages are obtained.

The first advantage of the present invention is that the manufacturing costs are reduced. This is because, in the present invention, a polyaniline layer can be formed efficiently by a series of process cycles, thus decreasing the number of process cycles.

The second advantage of the present invention is that the defective rate of the electrical properties of capacitors is reduced. This is because, in the present invention, a polyaniline layer can also be formed on the edges of the porous metal, and the damage of the oxidized film in these areas can be minimized at the exterior encapsulation process and the like.

The third advantage of the present invention is that the impedance property of capacitors can be improved. This is because, in the present invention, a thick polyaniline layer of a high conductivity can be formed around the porous metal, and therefore, electrical resistance between the solid electrolyte layer in the porous metal and the external electrodes can be decreased.

What is claimed is:

1. A process for producing a solid electrolytic capacitor using an anodic oxide film of a film forming porous metal as the dielectric, and polyaniline as the solid electrolyte comprising steps of:
   (a) immersing said porous metal in an anilinum protonic salt solution maintained at or above the dissolution temperature thereof;
   (b) thereafter cooling said porous metal to at most said dissolution temperature to deposit the crystals of said aniline protonate onto the surface of said porous metal, and
   (c) immersing said porous metal in a solution containing an oxidant.

2. A process for producing a solid electrolytic capacitor according to claim 1, wherein a concentration of said anilinum protonic salt solution is at least 40% by weight.

3. A process for producing a solid electrolytic capacitor according claim 1, wherein said dissolution temperature is 70° C.

4. A process for producing a solid electrolytic capacitor comprising a series of steps of, impregnating a fused liquid containing at least a monomer that forms a conducting polymer into a film forming porous metal under a fused condition, thereafter solidifying said liquid, and polymerizing said monomer by immersing said porous metal in an oxidant solution, so that a conducting polymer is also formed at the edges of said porous metal.

* * * * *